Jan. 22, 1929.
M. WYCKOFF
1,699,828
DITCH GUARD
Filed Aug. 7, 1926
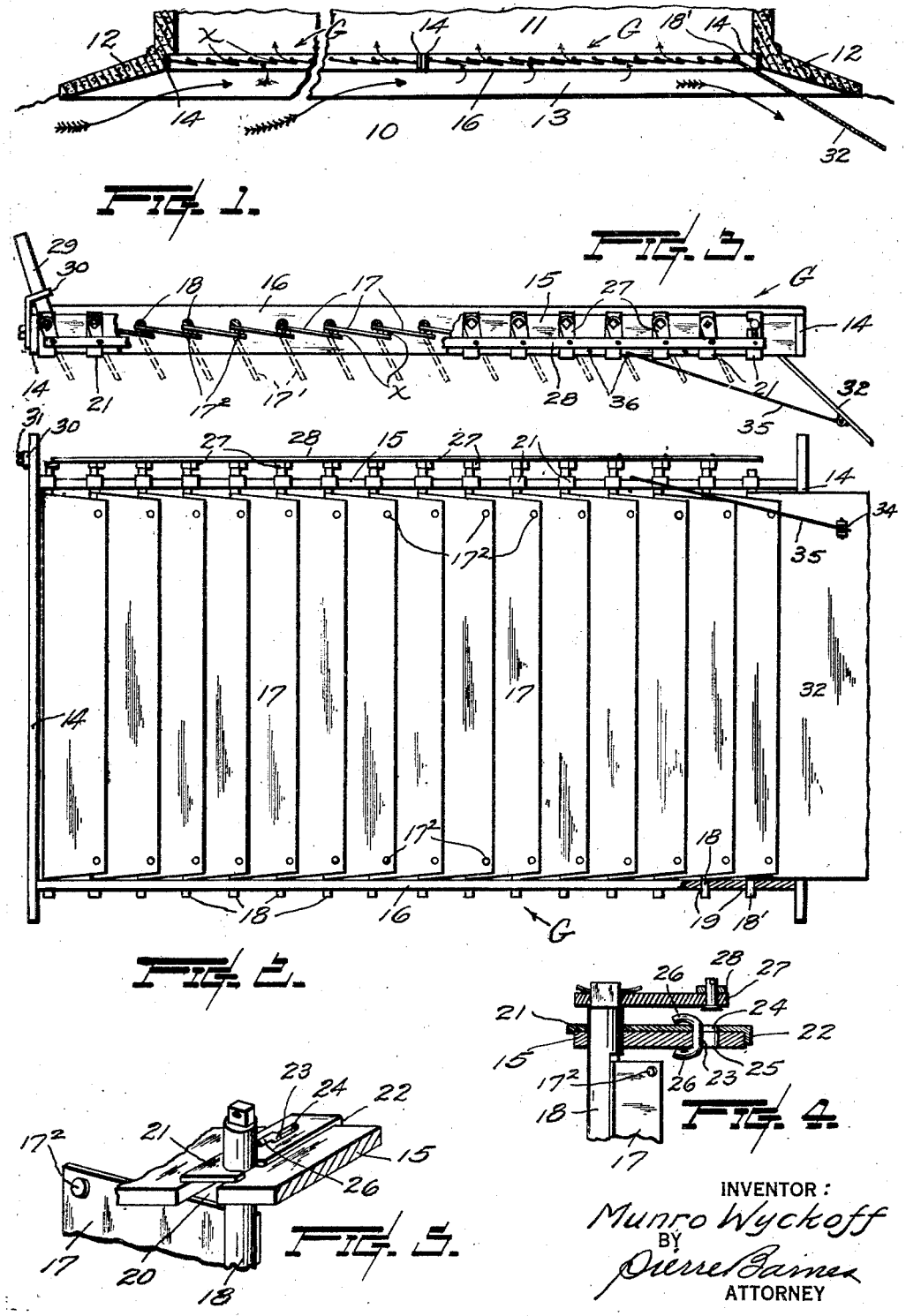
INVENTOR:
Munro Wyckoff
BY
Pierre Barnes
ATTORNEY Patented Jan. 22, 1929.

1,699,828

UNITED STATES PATENT OFFICE.

MUNRO WYCKOFF, OF SEATTLE, WASHINGTON.

DITCH GUARD.

Application filed August 7, 1926. Serial No. 127,750.

This invention relates to devices for excluding fish from a ditch, or the like, through which water is conveyed from a running stream for irrigating, power developing and other purposes.

It is recognized that the loss of fish, by being carried away in ditches has, in some districts, become a most serious problem; so serious, in fact that if not overcome threatens the very existence of the fishing industry. The passing away of some of the better varieties of salmon, in the States of Washington and Oregon, for example, is, in a large measure attributed to ditch losses. Comparatively few of the fish going into ditches hitherto have been utilized for food; the major portion—both of large and small fish—being used either for land fertilizing or allowed to go to waste.

The object of the present invention is the provision of apparatus which will permit ditches to be supplied with water unaccompanied by fish.

Another object is the provision of apparatus the parts of which are constructed and arranged to free itself of trash or other floating material tending to obstruct the passage of water into a ditch.

Another object is to provide apparatus which is adapted to be regulated to control the effective action of the stream of supply water with respect to the apparatus.

More specific objects and advantages of the invention will appear in the following description.

The invention consists of certain features of construction, and in the novel adaptation and combination of parts hereinafter described and claimed.

In the accompanying drawing—

Figure 1 is a horizontal sectional view shown somewhat diagrammatically, of ditch guarding devices embodying my invention, shown applied to the inlet of a ditch. Fig. 2 is a front elevation of a guard unit, in its preferred construction, a portion of the frame being shown in section. Fig. 3 is a plan view of Fig. 2, parts being broken away and showing parts in horizontal section. Fig. 4 is a detail transverse section of the upper portion of Fig. 2. Fig. 5 is a fragmentary perspective view illustrating certain parts shown in Fig. 4.

Referring first to Fig. 1, the numeral 10 represents a stream of water the direction of travel being toward the right hand in the view. 11 represents a ditch whose entrance in the stream bank is usually provided with side walls 12 and a floor 13 of cement concrete, wood or other suitable material.

A guard constituting the present invention and denoted generally by the letter G is provided at the ditch entrance between the walls 12 thereof.

Said guard consists of one or more units according to the width of the ditch. As best represented in Figs. 2 and 3, a guard unit consists of a rectangular rigid frame composed of vertical end elements 14 and horizontal top and bottom elements 15 and 16, respectively. Within said frame is a series of gates 17, each formed of a metal plate, preferably, secured at one of its side edges to a vertical post 18. The lower ends of the several gate posts extend into holes 19 (see Fig. 2) provided therefor in the lower frame element 16, their upper ends extending through openings, such as slots 20, provided in one side of the upper element 15 of the frame.

The holes 19 and slots 20 above referred to are disposed in horizontally spaced apart relations in the respective frame elements so that the posts will be held in vertical planes, or nearly so; and in such horizontal relation with each other that the free side of each gate will be lapped slightly past the post edge of the next gate when the gates are in the normal positions in which they are represented by full lines in Fig. 3. The overlapping portions of the gates are held in spaced apart relation with each other as by means of studs $17^2$ provided upon the respective gate plates.

The upper ends of the posts, as best shown in Figs. 4 and 5, are retained within the respective frame slots 20 by being engaged in hook attachments 21 of the frame; each attachment having, desirably, an end which is turned down, as at 22, to hook over the edge of the frame element 15 opposite to the slotted edge of the latter.

Said attachments 21 are detachably secured by bolts or other suitable means to the frame element 15; the means shown consisting of U-shaped clips. More specifically, each clip is formed with a central shank 23 (Fig. 4) rotatable in elongated holes 24 and 25 provided respectively in an attachment and the frame element 15, and having arms 26 which, by suitably turning the clip, serve to clamp the attachment to the frame. When the arms are brought into register with the holes 24—25, a clip may be withdrawn for disengaging an attachment 21 to release the associated gate post.

Being thus released, a gate is readily removed from the frame by first swinging its upper end outwardly from the respective slot 20 and then raising the gate to disengage its post from its connection in a hole 19 of the lower frame element 16.

Formed with, or rigidly secured as shown, upon the ends of the posts 18 above the frame are crank arms 27 which are connected with each other in series by means of an operating bar 28 whereby the gates may be simultaneously moved from their operating position in which they are illustrated by full lines in Fig. 3 into the positions in which they are indicated by dotted lines $17^1$ in Fig. 3.

The purpose of thus swinging the gates outwardly into the stream is to enable the latter to wash from the gates any small material collected thereon due to the currents of water going through the guard passages into the ditch.

Under ordinary conditions, however, the down flow of the stream water will keep the guard free from becoming clogged by material which is drawn against the guard plates by currents of water passing into the ditch through the passages between the overlapping portions of successive plates.

The operating bar 28 may be actuated to control the gates as by means of a second arm 29 provided upon one of the gate posts 18. An extension, in the nature of a pipe, not shown, may advantageously be applied to the arm 29 to facilitate the gate opening movements when the stream current is rapid. 30 represents a latch pivotally connected as by means of a bolt 31 to the frame and adapted to engage the arm 29 for releasably retaining the gates in their operating relations.

At the down stream end of a unit, or a plurality of associated units, there is desirably provided a wing 32 whose function is to retard or otherwise regulate the stream action in front of the guard gates. As shown, the wing 32 is formed of a plate element and post element $18^1$ which latter may be journaled in companion openings 19 and 20 of the frame.

The wing 32 is connected as at 34 to an end of a rod 35 whose other end is engaged in any one, selectively, of a plurality of apertures, as 36, provided in the frame element 15, whereby the angular relation of the wing is regulated to suitably control the stream water at the guard.

In the operation of my improved guard, water passes in a multiplicity of streams through the narrow passages X obtaining between the successive gates. The gates are arranged to be in planes almost parallel with the direction of the current of the main or supply stream 10 and, in consequence, the water passing into the ditch is compelled to pass about the down stream edges of the gates and is compelled to travel in a direction opposite to that of the main stream when entering the ditch. Such arrangement of the blades, moreover, presents no abutments against which material can lodge in its travel down stream, as the upstream edge of the gates are overlapped by the downstream edges of the gates next in front.

The passages for water through the ditch guard are thus kept free of material, but are too small to accommodate fish and thereby exclude them from the ditch.

The operation of the invention will, it is thought, be understood from the foregoing description.

What I claim is,—

1. A ditch guard adapted to be placed at the entrance of a ditch and in exposed relation with a stream of water from which the ditch is supplied, said guard comprising a frame, and a series of plates provided in said frame in spaced relation longitudinally of the supply stream, said plates having their adjacent ends slightly separated and lapped past each other, and a means operably connected to said plates whereby the plates are movable collectively into said stream.

2. In a ditch guard as defined in claim 1 wherein the plates are disposed in substantially vertical planes, and the upstream ends of the respective plates are pivotally connected to the frame for movements about substantially vertical axes.

3. A ditch guard comprising a frame, a series of plates provided in said frame in spaced relations with each other longitudinally of the frame so as to be lapped past each other, means to pivotally connect one edge of each plate to the same, and means for regulating the plates into selected angular relations with the frame.

4. A ditch guard comprising a frame, a series of plates provided in said frame in spaced relations with each other longitudinally of the frame so as to be lapped past each other, means to pivotally connect one edge of each plate to the frame, and means connected to the aforesaid means for regulating the same to move the plates simultaneously into selected angular relations with the frame.

5. A ditch guard comprising a frame, a series of plates, posts rigid with the respective plates, means provided upon the frame for pivotally and detachably connecting the plates thereto, and means acting through the medium of said posts for moving the plates into different angular relations, selectively, with respect to the frame.

6. A ditch guard having a frame, plates provided therein and arranged to be lapped past each other longitudinally of the frame, and a wing element extending in angular relation with the frame at one end thereof.

7. In a ditch guard of the character described, a frame, a wing member provided at one end of the frame, said wing member being pivotally connected to the frame for angular adjustments with respect thereto, and means having one end thereof connected to the wing member and adapted to have its other end connected to the frame for securing said member in predetermined angular relations with the frame.

Signed at Seattle, Washington, this 14th day of June, 1926.

MUNRO WYCKOFF.